United States Patent

Deubel et al.

[11] 4,009,142
[45] Feb. 22, 1977

[54] SULFONSUCCINIC ACID SEMI-ESTERS, PROCESS FOR THEIR PREPARATION AND THEIR USE IN PIGMENT PREPARATIONS FOR AQUEOUS FLEXO PRINTING PASTES

[75] Inventors: Reinhold Deubel, Altenhain, Taunus; Max Grossmann, Frankfurt am Main; Volker Hemmerling, Schwalbach, Taunus; Heinz Uhrig, Steinbach, Taunus, all of Germany

[73] Assignee: Hoechst Aktiengesellschaft, Frankfurt am Main, Germany

[22] Filed: Feb. 27, 1975

[21] Appl. No.: 553,633

Related U.S. Application Data

[63] Continuation of Ser. No. 458,523, May 29, 1974, abandoned, which is a continuation-in-part of Ser. No. 267,513, June 29, 1972, abandoned.

[30] Foreign Application Priority Data

June 30, 1971 Germany ............... 2132404

[52] U.S. Cl. ............... 260/38; 260/59 R; 260/59 EP
[51] Int. Cl.[2] ............... C08R 9/04
[58] Field of Search ............... 260/59 R, 59 EP, 38

[56] References Cited

UNITED STATES PATENTS

| 2,489,943 | 11/1949 | Wilson et al. | 260/29.2 E X |
| 3,320,212 | 5/1967 | Shen et al. | 260/49 |
| 3,546,153 | 12/1970 | Mellan et al. | 260/59 R X |

Primary Examiner—Melvyn I. Marquis
Assistant Examiner—S. M. Person
Attorney, Agent, or Firm—Curtis, Morris & Safford

[57] ABSTRACT

A sulfosuccinic acid semi-ester of the formula

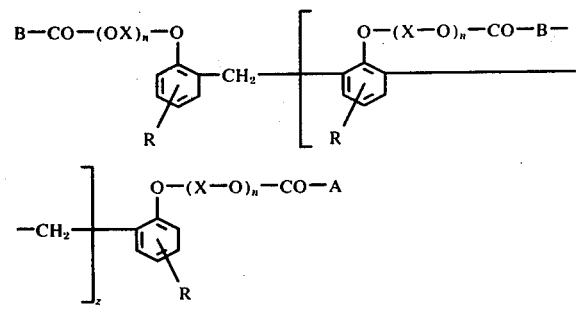

wherein A is a group of the formula

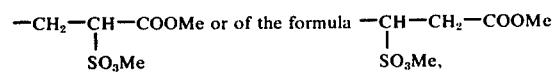

B is a hydrogen atom and/or a group of the meaning given for A, X is an ethylene or propylene group, R is a saturated alkyl radical having from 6 to 14 carbon atoms, Me is a hydrogen atom, an alkali metal atom or an equivalent of an alkaline earth metal atom, $n$ is an integer from 2–25 and $z$ is an integer from 1–9.

These sulfosuccinic acid semi-esters are prepared by oxethylating multinuclear alkyl phenols, reacting the oxethylates so obtained with maleic acid anhydride to the maleic acid semi-esters and adding to these semi-esters alkali metal or alkaline earth metal sulfites. Because of their slight tendency to foaming and their poor inherent colour they are excellent dispersing agents for the preparation of highly pigmented pigment preparations of good flow properties which are used in aqueous flexo prints.

1 Claim, No Drawings

SULFOSUCCINIC ACID SEMI-ESTERS, PROCESS FOR THEIR PREPARATION AND THEIR USE IN PIGMENT PREPARATIONS FOR AQUEOUS FLEXO PRINTING PASTES

This is a continuation of application Ser. No. 458,523, filed May 29, 1974, and now abandoned, which, in turn, is a continuation-in-part of application Ser. No. 267,513, filed June 29, 1972, and now abandoned.

The present invention relates to sulfosuccinic acid semi-esters, a process for their preparation and their use in pigment preparations for aqueous flexo printing pastes.

The requirements to be met by pigment preparations for aqueous flexo prints are much higher because high-speed printing machines are used and further developments in the field of binding agents have been made. Standardizations having good flow properties containing high pigment concentrations are necessary for this purpose. Since the binders used in flexo printing have concentrations of solid body ranging from about 15 to 30 % by weight and a determined range of viscosity must be maintained in the printing paste in the case of a mixing ratio of 2 : 1 of binder to pigment, only a slight portion of liquid can be admitted in the pigment preparation. Besides, the pigment pastes should contain only weakly foaming dispersing agents in order to prevent the pigmented printing paste from foaming as this would cause coagulation of the pigments and unevenness of the prints. Furthermore, the dispersing agents are required to have only poor inherent colour, especially in the case of fair and brilliant shades. In spite of high pigment concentrations, the pastes should be able to flow and to be pumped so that they can be simply handled and suitably be dosed in practice. The dispersing agents generally used in the moment meet only one or the other of the requirements mentioned above. Thus, for example, pigment pastes of higher concentration having flow properties can be prepared with certain lignin sulfonates which can, however, be used only to a limited extent because of the inherent colour of the dispersing agents. Dispersing agents prepared on the basis of naphthalene sulfonic acid/formaldehyde have, however, only poor inherent dyeing properties and a poor tendency to foaming, but they cannot be worked to pastes of good flow properties in high pigment concentrations.

The use of oxalkylated alkyl phenols or the sulfatation products thereof allows the preparation of pastes of higher pigment concentrations capable of flowing, but their use in aqueous flexo printing dyestuffs is limited because of their high tendency to foaming. The aqueous pigment pastes developed on the basis of those dispersing agents and dealt in commerce are preponderantly used for the dyeing with disperse dyes for inner and outer coatings or for the pigment print on textile materials. But they do not meet the high requirements expected from aqueous flexo printing dyes and are, therefore, not suitable for use in this application field.

The present invention provides sulfosuccinic acid semi-esters of the general formula

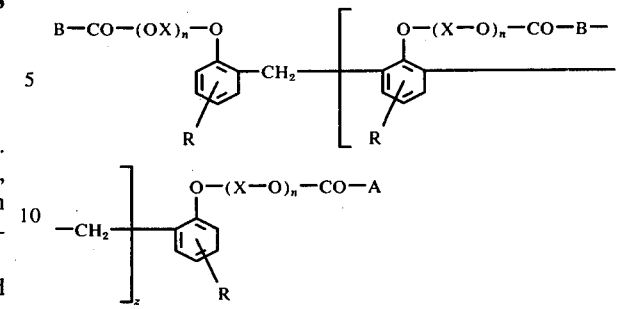

wherein A represents a group of the formula

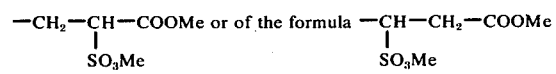

B represents a hydrogen atom and/or, preferably, a group having the meaning of A, X represents an ethylene or propylene group, R represents a saturated alkyl radical having from 6 to 14 carbon atoms, Me represents a hydrogen atom, an alkali metal atom or an equivalent of an alkaline earth metal atom, $n$ is an integer from 2 to 25, preferably from 3 to 15 and $z$ is an integer from 1 to 9.

This invention also provides a process for the preparation of these esters and their use in pigment preparations for aqueous flexo printing pastes.

The sulfosuccinic acid semi-esters of the general formula (1) are prepared by oxalkylating multinuclear alkyl phenols, reacting the oxalkylates so obtained with maleic acid anhydride to the maleic acid semi-esters and adding to these semi-esters alkali metal or alkaline earth metal sulfites.

Suitable starting products are multinuclear alkyl phenols (novolacs) obtained by acid condensation of monoalkyl phenols, for example, octyl, nonyl, dodecyl phenol or mixtures thereof with formaldehyde in a molar ratio of from 2 : 1 to 10 : 9. The formaldehyde may be used as aqueous solution or as paraformaldehyde. As catalysts, there may be used, because of their volatility, mineral acids, such as sulfuric acid, phosphoric acid, or preferably, hydrochloric acid in a concentration of from 0.1 to 5 % by weight. The condensation is carried out at a temperature of from 20° to 150° C, preferably from 80° to 130° C under nitrogen atmosphere. The water which is present after the condensation must be distilled off, ultimately under reduced pressure (50 mm mercury) until the water content in the resin is below 0.3 %.

These novolacs are relatively brittle, limpid resins of yellow-brown shade in the form of blocks. They consist of mixtures of alkyl phenols linked by methylene bridges. Their constitution depends above all from the ratio of alkyl phenol to formaldehyde.

The oxalkylation of the mononuclear and multinuclear alkyl phenols is effected with alkylene oxides, for example, 1,2-propylene oxide or, preferably, with ethylene oxide, according to known methods, using alkali metal hydroxides or alkoxides preferably as catalysts, at a temperature within the range of from 100° – 200° C, preferably of from 140° to 170° C. The alkylene oxide is chosen in such an amount that from 2 to 25 moles of it are introduced per phenolic hydroxyl group each.

As alkali metal hydroxides there may be used potassium hydroxide or, preferably, sodium hydroxide, as alkali metal alkoxides sodium methylate or ethylate in a concentration which should be within the range of from 0.05 to 1.0 % by weight, calculated on the phenol, at the beginning of the oxalkylation. The oxalkylation can be carried out pressureless or in pressure vessels with propylene oxide or, preferably, ethylene oxides or mixtures of both compounds; the alkylene oxide may be introduced in gaseous or liquid form.

The reaction of the oxalkylates so prepared with maleic acid anhydride to yield the maleic acid semi-esters is carried out by mixing the components and stirring the mixture at a temperature within the range of from 20° to 100° C, preferably from 40° to 80° C, in the presence of alkali metal hydroxides which should be in a concentration of from 0.05 to 1.5 % by weight, calculated on the total mixture. Since maleic acid anhydride has a tendency to sublimation it is advantageous to work in pressure vessels under a pressure of from 0.2 to 1.0 atmospheres gauge of nitrogen or air and to mix thoroughly, as at the beginning of the reaction the molten maleic acid anhydride is not easily miscible with the oxalkylates. The amount of the maleic acid anhydride can be measured in such a manner that the totality of, or only a part, but one at least of the oxalkylate/-hydroxyl end groups is reacted.

The conversion of the maleic acid semi-ester compounds into the corresponding sulfosuccinic acid semi-esters is effected after the addition of aqueous solutions of sulfites or hydrogen sulfites. The amount of alkali metal or alkaline earth metal sulfites or bisulfites or pyrosulfites introduced per group of maleic acid semi-ester is within the range of from 1.0 to 1.5, preferably from 1.05 to 1.1 moles, calculated as sulfurous acid. The sulfites are especially convenient as they lead to the formation of the Di-salts of the sulfosuccinic acid semi-esters.

The amount of water added may be within the range of from 50 to 85 % by weight calculated on the total solution or mixture and depends on the solubility of the sulfosuccinic acid semi-ester salts and on the viscosity of the solutions. The reaction temperatures are within the range of from 20 to 100° C, preferably from 40° to 80° C. The 15 to 50 % aqueous solutions can be used directly. The water may, however, also be eliminated from the solutions by spray-drying before being further used.

Because of their slight tendency to foaming and their poor inherent colour the sulfosuccinic acid semi-esters so obtained are excellent dispersing agents for the preparation of highly pigmented pigment preparations of good flow properties which are used in aqueous flexo prints.

The pigment preparations are prepared in known manner by dispersing the pigments, for example, azo pigments, azo lake pigments, triphenyl methan pigments, thioindigo pigments, perylene tetracarboxylic acid pigments, dioxazine pigments, quinacridon pigments or phthalocyanine pigments with the sulfosuccinic acid semi-esters by adding ethylene glycol, water, and, optionally, slight amounts of other dispersing agents in a suitable dispersing device, for example, a bead mill or a double troughed kneader. The preparation in the kneader is effected in such a manner that the pigments are introduced into the aqueous solution of the sulfosuccinic acid semi-esters placed in advance in the kneader, if desired, by adding slight amounts of another dispersing agent and are kneaded at tough consistency. After having been finely dispersed, they are diluted with ethylene glycol and water to yield the desired tinctorial strength and consistency. When using a bead mill, the pigments are homogenized in a mixture of the above-mentioned aqueous dispersing agent, ethylene glycol and water, optionally slight amounts of other dispersing agents, and stirred to yield a paste. This suspension capable of being pumped is then generally ground in a continuous stirrer mill with quarzite beads of a 1 – 3 mm diameter, if necessary in several passages, until the suspension shows the desired fine dispersion. Then, the tinctorial strength desired can be obtained with water or ethylene glycol. The ratio between dispersing agent and pigment powder may vary within wide limits and is, in general, within the range of from 0.1 to 0.2 parts by weight of dispersing agent per part of dry pigment powder.

The following Examples illustrate the invention, the parts and percentages being by weight.

EXAMPLE

Preparation of the sulfosuccinic acid semi-esters of oxalkylated multinuclear alkyl phenols.

a. Preparation of the novolacs $Z + 1$ mole of alkyl phenol and $Z$ mole of formaldehyde were mixed at room temperature and stirred at a temperature of from 95° – 106° C for 4 hours under reflux after having added 0.55 % of concentrated hydrochloric acid, calculated on alkyl phenol. Then the water is separated by distillation, at last under reduced pressure at about 20 – 2 mm mercury.

b. Oxalkylation and preparation of the sulfosuccinic acid semi-esters 1 mole of novolac was oxalkylated with 0.2 % of NaOH, calculated on novolac, at 140° – 170° C with $(z + 1)n$ moles of ethylene oxide and esterified at from 50° – 80° C with $z + 1$ or less moles of maleic acid anhydride while stirring. After dilution with water, 1.05 to 1.1 moles of sodium sulfite were introduced as aqueous solution at a temperature of from 40° – 80° C within from 15 to 120 minutes while stirring and stirring was continued for 1 hour after the reaction mixture had become clearly water-soluble. The amount of water which had been added may be within the range of from 50 to 85 % of the final solution.

According to these methods, the compounds disclosed in the following Table have been prepared:

Table 1

Starting compound novolac $$\text{HO-C}_6\text{H}_3(\text{R})\text{-[CH}_2\text{-C}_6\text{H}_3(\text{R})(\text{OH})\text{]}_z\text{-H}$$

| Substance No. | R | z | Mole | Ethylene oxide Mole | Maleic acid anhydride Mole | Maleic acid semi-ester $n_D 25$ | Acid Number Found | Acid Number Calculated | $Na_2SO_3 \cdot 7H_2O$ Mole |
|---|---|---|---|---|---|---|---|---|---|
| 1 | $C_9H_{19}$ | 1 | 1 | 12 | 2 | 1.5078 | 96.7 | 95.4 | 2.2 |
| 2 | " | 2 | 1 | 6 | 3 | 1.5252 | 144.0 | 135.8 | 3.3 |
| 3 | " | 3 | 1 | 9 | 4 | 1.5254 | 141.0 | 131.0 | 4.4 |
| 4 | " | 8 | 1 | 54 | 9 | 1.5111 | 101.0 | 94.4 | 9.9 |
| 5 | $C_9H_{19}$ | 1 | 1 | 6 | 2 | 1.5153 | 137.0 | 122.5 | 2.2 |
| 6 | " | 1 | 1 | 21 | 2 | 1.4987 | 79.2 | 70.8 | 2.2 |
| 7 | " | 1 | 1 | 12 | 1 | 1.5025 | 50.8 | 50.7 | 1.1 |
| 8 | " | 2 | 1 | 9 | 3 | 1.5208 | 126.8 | 122.3 | 3.3 |
| 9 | " | 2 | 1 | 12 | 3 | 1.5156 | — | — | 3.3 |
| 10 | " | 2 | 1 | 18 | 3 | 1.5098 | 97.2 | 94.8 | 3.3 |
| 11 | " | 2 | 1 | 21 | 3 | 1.5075 | 99.1 | 88.4 | 3.3 |
| 12 | " | 2 | 1 | 18 | 2 | 1.5085 | 67.6 | 67.2 | 2.2 |
| 13 | " | 3 | 1 | 12 | 4 | 1.5222 | 123.0 | 121.5 | 4.4 |
| 14 | " | 3 | 1 | 15 | 4 | 1.5190 | 113.5 | 116.5 | 4.4 |
| 15 | " | 3 | 1 | 18 | 4 | 1.5168 | 108.8 | 106.4 | 4.4 |
| 16 | " | 3 | 1 | 21 | 4 | 1.5129 | 107.0 | 100.0 | 4.4 |
| 17 | $C_9H_{19}$ | 2 | 1 | 60 | 3 | 1.488 | 50.4 | 46.6 | 3.3 |
| 18 | $C_9H_{19}$ | 8 | 1 | 224 | 9 | FP34.5–35.5 °C | 40.4 | 39.3 | 9.9 |
| 19 | $C_{12}H_{25}$ | 2 | 1 | 24 | 3 | 1.5050 | 76.6 | 77.5 | 3.3 |
| 20 | $C_9H_{19}$ | 2 | 1 | 6 PO 12AO 1) | 3 | 1.5056 | 89.1 | 88.9 | 3.3 |
| 21 | $C_9H_{19}$ | 2 | 1 | 6 PO 12AO 2) | 3 | 1.4992 | 90.5 | 90.5 | 3.3 |
| 22 | $C_6H_{13}$ | 4 | 1 | 27 | 5 | 1.5134 | 107.4 | 107.1 | 5.5 |

1) First 6 moles of PO (propylene oxide), then 12 EO (ethylene oxide) (block-oxalkylate).
2) Mixture of 6 PO and 12 EO, oxalkylated (mixed oxalkylate) with statistical distribution of the PO and EO radicals.

The following Examples describe the preparation of pigment preparations for aqueous flexo printing pastes on the basis of sulfosuccinic acid semi-esters as dispersing agents.

EXAMPLE 1

125 Parts of the azo pigment (Pigment Yellow 12, Colour Index Number 21090) prepared by coupling diazotized 3,3'-dichlorobenzidine with acetoacetic aniline were kneaded at tough consistency for about 1 hour with 64 parts of a 35 % aqueous solution of the sulfosuccinic acid semi-ester as referred to under No. 2 in the above Table in a double trough kneader. After having been finely divided, the paste was diluted with 60 parts of ethylene glycol and 11 parts of water. The fluid pigment preparation containing 55 % pigment can be standardized in any ratio with aqueous flexo-printing varnishes, for example, saponified shellacs, saponified polyvinyl acetates, by simple stirring to yield a flexo printing paste.

EXAMPLE 2

200 Parts of a copper-phthalocyanine pigment (Pigment Blue 15, Colour Index Number 74160) were kneaded at tough consistency for about 3 hours in a double trough kneader with 100 parts of an aqueous solution containing 30 % of the sulfosuccinic acid semi-ester as referred to under No. 1 in the above Table by adding 10 parts of di-naphthoylmethanedisulfonate. By subsequent dilution with 80 parts of ethylene glycol and 10 parts of water, a paste of flow properties containing 50 % pigment was obtained.

EXAMPLE 3

57 Parts of an azo lake pigment (Pigment Red 53, Colour Index Number 15585 Lake) were ground for 2 hours in a 1 liter laboratory bead mill in 27 parts of a 35 % aqueous solution of the sulfosuccinic acid semi-ester referred to under No. 2 in the above Table, 20 parts of ethylene glycol and 38.5 parts of water by adding about 600 parts of siliquarzite beads (2–3 mm of diameter) as tackles. After grinding had been finished, the tackles were suction-filtered via a sieve after which a pourable pigment dispersion remained having a pigment content of 40 %.

EXAMPLE 4

When dispersing 312 parts of Pigment Red 14 (Colour Index Number 12380) with 102 parts of a 40 % aqueous solution of the sulfo succinic acid semi-ester No. 3 in the above Table by adding 6 parts of dinaphthoyl-methane-disulfonate in the same manner as described in the Example 1 given above, subsequently diluting with 120 parts of ethylene glycol and 60 parts of water to a pigment content of 52 %, a pigment preparation having good rheological properties and only poor tendency to foaming was obtained which was very suitable for the preparation of flexo printing pastes.

EXAMPLE 5

75 Parts of the pigment obtained by mixed coupling of diazotized 3,3'-dichlorobenzidine with acetic acid anilide and acetic acid-p-anisidide in a ratio of 9:1 were kneaded at tough state for about 2 hours in a double trough kneader with 40.5 parts of a 35 % aqueous solution of the sulfosuccinic acid semi-ester referred to under No. 4 of the above Table. After fine division had been completed, the paste was diluted with 30 parts of ethylene glycol and 4.5 parts of water whereupon a paste was obtained which had good rheological properties and contained 50 % of pigment.

We claim:

1. Pigment preparations containing as a dispersing agent 0.1 to 0.2 parts by weight, based on one part by weight of dry pigment powder, of a sulfosuccinic acid semiester obtained by acid condensation of a monoalkylphenol containing an alkyl group with 6 to 14 carbon atoms with formaldehyde in a molar ratio of from 2 : 1 to 10 : 9, oxalkylating the novalac thus obtained with 2 to 25 moles of 1,2-propylene oxide or ethylene oxide per phenolic hydroxy group, reacting the oxalkylate thus obtained with maleic acid anhydride and reacting the maleic acid semi-ester thus obtained with an alkali metal or alkali earth metal sulfite, bisulfite or pyrosulfite.

* * * * *

UNITED STATES PATENT AND TRADEMARK OFFICE
CERTIFICATE OF CORRECTION

PATENT NO. : 4,009,142
DATED : February 22, 1977
INVENTOR(S) : Deubel et al.

It is certified that error appears in the above—identified patent and that said Letters Patent are hereby corrected as shown below:

In the Heading, Item [54], change "SULFONSUCCINIC" to
--SULFOSUCCINIC--;

Item [63], change "Ser. No. 458,523, May 29, 1974" to --Ser. No. 468,523, May 9, 1974--;

Signed and Sealed this

Nineteenth Day of April 1977

[SEAL]

Attest:

RUTH C. MASON
Attesting Officer

C. MARSHALL DANN
Commissioner of Patents and Trademarks